W. N & A. Whiteley.
Harvester.

N° 72349. Patented Dec. 17, 1867.

Figure 1.

W. N & A. Whiteley.
Harvester.
No. 72349
Patented Dec. 17, 1867.

Figure 4.

W. N. & A. Whiteley.
Harvester.

№ 72349. Patented Dec. 17, 1867.

Figure 5.

W. N & A. Whiteley.
Harvester.

N°72349. Patented Dec. 17, 1867.

UNITED STATES PATENT OFFICE.

WILLIAM N. WHITELEY, JR., AND ANDREW WHITELEY, OF SPRINGFIELD, OHIO.

IMPROVEMENT IN HARVESTING-MACHINES.

Specification forming part of Letters Patent No. 72,349, dated December 17, 1867.

*To all whom it may concern:*

Be it known that we, WILLIAM N. WHITELEY, Jr., and ANDREW WHITELEY, of Springfield, in the county of Clark and State of Ohio, have made certain new and useful Improvements in Harvesting-Machines; and we do hereby declare that the following is a full, clear, and exact description of the same, reference being had to the accompanying drawings, forming a part of this specification, by letters and figures.

To enable those skilled in the art to construct and use our several improvements, we will proceed to describe their construction and manner of operation.

The nature of our invention consists in constructing a harvesting-machine in such a manner that it can be used for both mowing and reaping, and when used for reaping, have the grain removed from the platform by any one of the several automatic and hand-raking systems hereinafter described; and our invention further consists in various improved methods of construction in the several parts of the machine, or in the manner of combining the parts thereof, as will be hereinafter severally and fully described.

That side of the machine, side of a separate part, or end thereof, at the right, when behind and facing the machine, we call the inner side or end, whichever it be, and that or those at left, the outer.

Fig. 9, a perspective view of the machine. Fig. 10 represents an inner side elevation of the cutter's driving-wheel, showing it in gear with the pinion used for reaping, and the mode of adjusting the height of the main frame.

The same letters or figures refer to the same parts in all the different views.

The main frame of our improved harvester is formed by two main beams A $A^1$, two connecting-pieces $B^1$ $B^2$, one flat horizontal extension-bar $D'$, one shoe or coupling-box E, one connecting or brace rod $F'$, and one combination-box G, bolted together as shown. The beam $A^1$ is somewhat thicker than the beam A, to sustain the combination-box, tongue, &c. Both beams are the same width and length, set edge upward, and bolted to the connecting-piece $B^2$ just in front of the main ground-wheel $A^2$. The front ends of these beams are also bolted to the flanges of the connecting-piece $B^1$, which piece may, if desired, be dispensed with, but by using it the front ends of the beams are held in a more firm and rigid manner than without it, and the strength of both opposed against the leverage of the tongue. To the under edges, and near the rear ends of these beams A $A^1$, is bolted the extension-bar $D'$. This bar is bent downward at the proper place sufficiently to permit its main part to pass over the cut grass without dragging the same forward, and is then extended out again, about parallel with the main part, so as to fit the shoe or coupling-box E, and the end of the finger-bar $E'$, when the latter is lying in its bed in this shoe or coupling-box. The inner end of this finger-bar $E'$ fits the mortise formed by the shoe E and extension-bar $D'$, as an ordinary tenon, and is there confined by screw-bolts. To the front end of the shoe or coupling-box E is attached the rear end of the rod $F'$, and the front end of the same is attached to a projecting lip of the combination-box G, which latter is firmly bolted to the outer side and upper edge of beam $A^1$, and sustains the master-wheel's pinion-shaft $g'$ and the front end of the cutter's driving crank-shaft.

The coupling-arm $H^1$ is hung upon a cylindrical projecting part of the combination-box G, which surrounds the pinion-shaft $g'$, so that in its vertical movements said coupling-arm moves about the axis of said pinion-shaft. The coupling-arm $H^2$ is hung upon a cylindrical stud, $b'$, which projects from the side piece A, and with its axis coincident with the axis of the pinion-shaft $g'$.

The cutter's driving-wheel $A^2$ is mounted upon the coupling-arms $H^1$ and $H^2$, by means of the boxes $e^2$, which are secured to the upper edges of said coupling-arms by screw-bolts $f'$, which pass through slots, so that said boxes and the axle of the driving-wheel may be adjusted farther from or nearer to the axis of the pinion-shaft $g'$. Vertical adjustment of the coupling-arms $H^1$ $H^2$ is obtained by means of the series of holes $h'$ $h'$ in each of said arms, and the screw-bolts $i^2$ $i^2$, which pass through either of said holes and into the adjoining side piece of the main frame. This adjustment is for the purpose of holding the main frame at a greater or less distance from the ground, as may be desired.

By having the main frame thus connected to the axle of the cutter's driving-wheel, the attendant is enabled to readily vary the height of this frame and the inner end of the cutting apparatus for reaping, the cutter's angle to the ground for mowing, or vary the distance between the axle $j'$ of the cutter's driving-wheel $A^2$ and this wheel's pinion-shaft $g'$, so that the driving cog-wheel shall mesh perfectly with its pinion.

W is the shipper by which the attendant throws the cutter's driving mechanism in and out of connection, and it is pressed down upon its seat by a curved spring, $t$, with a hole in its central portion through which the fulcrum-pin $v$ passes, and is secured by a screw-nut or its equivalent. By having one end of this spring $t$ held rigid with the shipper, the other end need not touch it. Its elasticity holds the shipper properly in place when throwing the cutter or any other connected portions of the harvesting-machine out or into connection, and without springing or bending the shipper. It is therefore a very useful thing.

Figures 6, 7, 8:
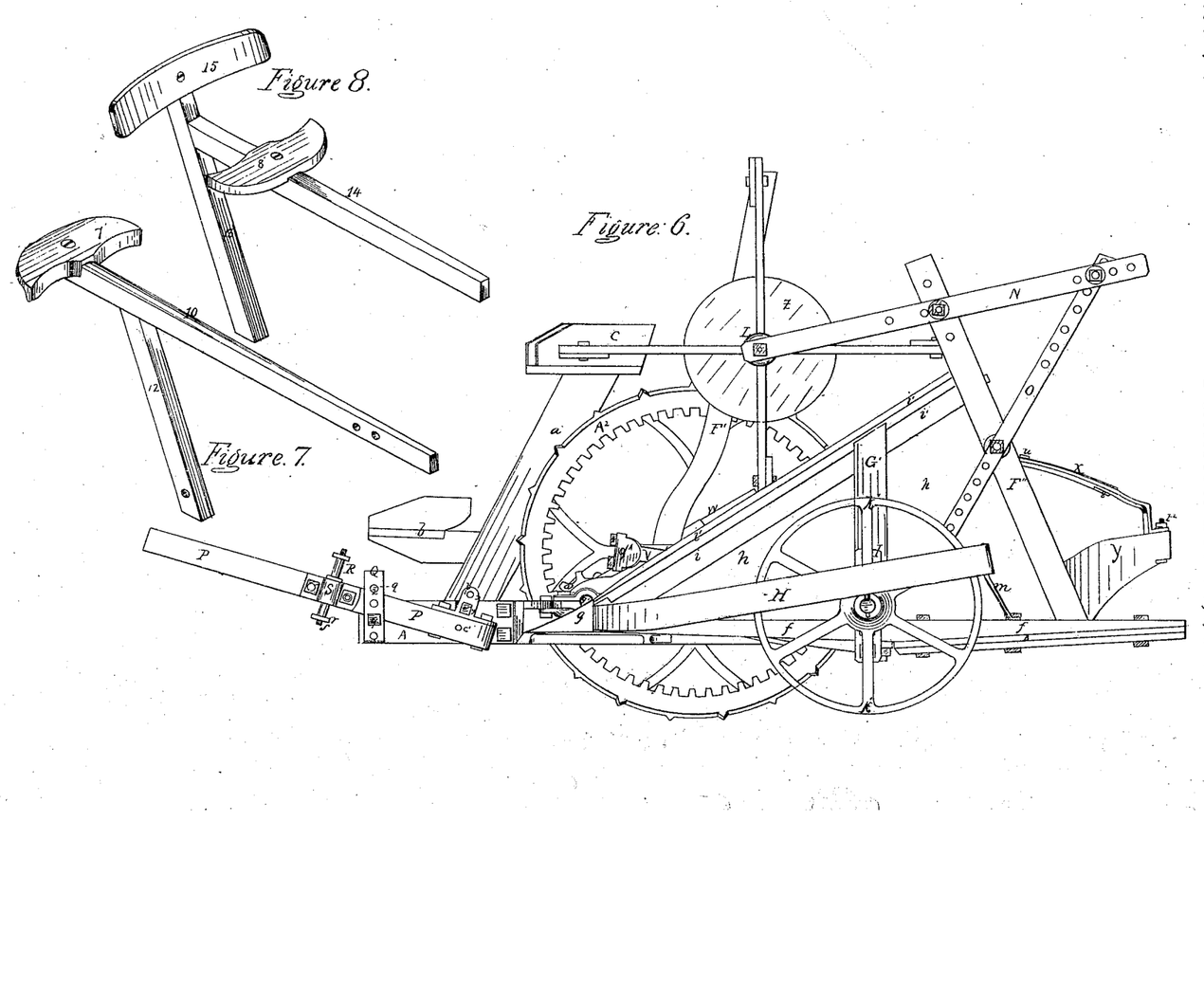
Fig. 6, an outer side elevation.
Figs. 7 and 8 represent the adjustable raker's stand or seat, as detached from the machine.

$p'$ is a lug attached to the rear end of the tongue P by a screw-bolt, $c'$, and has holes $y$ $y$, Fig. 6, through it to permit the heel of the tongue to be adjusted upward or downward by inserting the pivot-bolt $a^4$ through either one of them, or through the one in the tongue, so as to vary the point of attachment to the tongue vertically, and when a greater vertical variation of the tongue's heel, in respect to the main frame, is desired, this adjustable portion $p$ is shifted to the lower side of the tongue.

Q is a retaining-stirrup, having a series of holes equidistant from each other in its vertical sides, agreeing with the holes $d'$ $d'$ $d'$ (seen in Fig. 10) in the main frame beam $A^1$. This stirrup is confined to this beam $A^1$ by one or two short screw-bolts, leaving one or two of the holes $d'$ $d'$ $d'$ open for receiving one of the long bolts $q$ that pass through both sides of this stirrup above and below the tongue, for confining it at the proper position in respect to said beam $A^1$.

By having this retaining-stirrup thus constructed and connected to the main frame, its vertical position in respect to the frame can be varied as desired, and also the height of the tongue in respect to this stirrup, so as to bring the tongue at the desired angle to the main frame when reaping; and when the bolts through the stirrup, above and below the tongue, are removed, the main frame is free to vibrate upon the master-wheel's axle $j'$ when mowing, and the attendant is enabled to place the draft-point of the team at the proper vertical position to give the cutting apparatus a light or heavy bearing upon the ground.

R is the bolt by which the team draws the machine. This bolt is inserted in the vertical slot formed in the stand S, Figs. 1 and 2, secured to the inner edge of the tongue P. By having this bolt R at the outside of the tongue, the outer horse has more room when turning at the corners. The slot is made in the stand S for enabling the attendant to adjust this draft-bolt R so as to be at the right place, whether the resistance against the cutting apparatus, in being drawn forward, be more or less.

Figure 5:
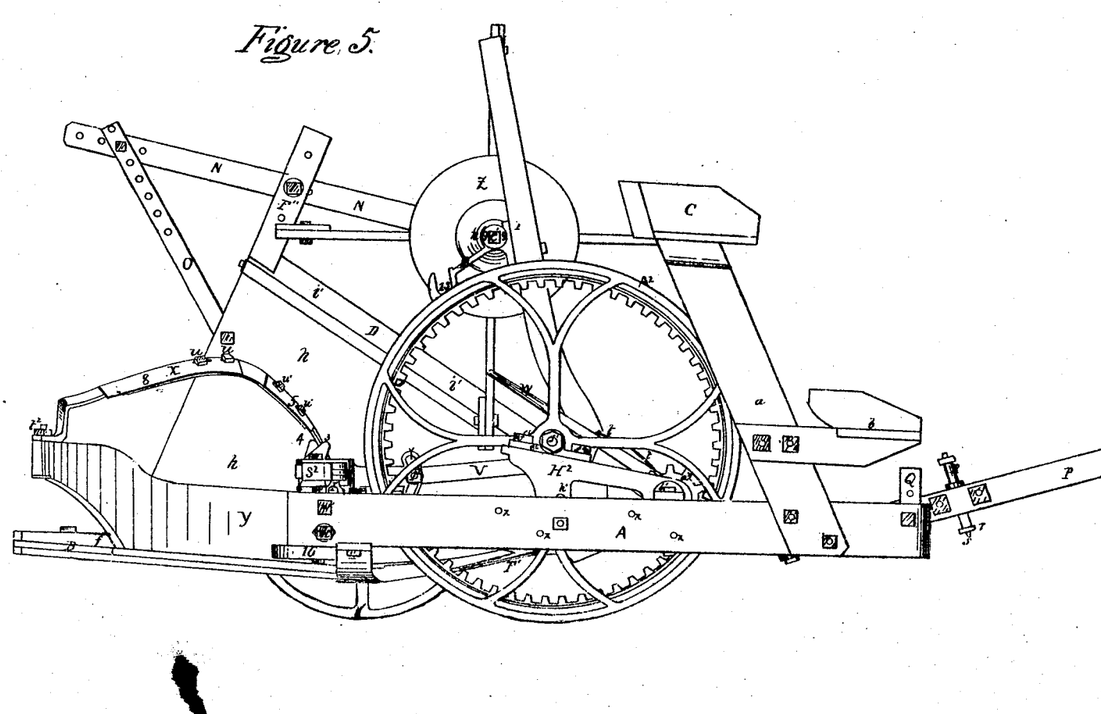
Fig. 5, an inner side elevation.

In both the front and rear ends of the beam $A^1$, Fig. 10, are two horizontal holes $x$ $x$, and in A, Fig. 5, is a series of these holes $x$ $x$, part in front and part in rear of the axle $j'$, for receiving the bolts $c$ $c$ that confine the leg $a$ of the driver's foot-board $b$ and seat C to whichever of these beams, and to whatever position thereof, that will enable this leg, foot-board, and seat, with the occupant thereon, to properly balance the machine for doing its different kinds of work, and in the different modes of doing the same.

Figure 2:
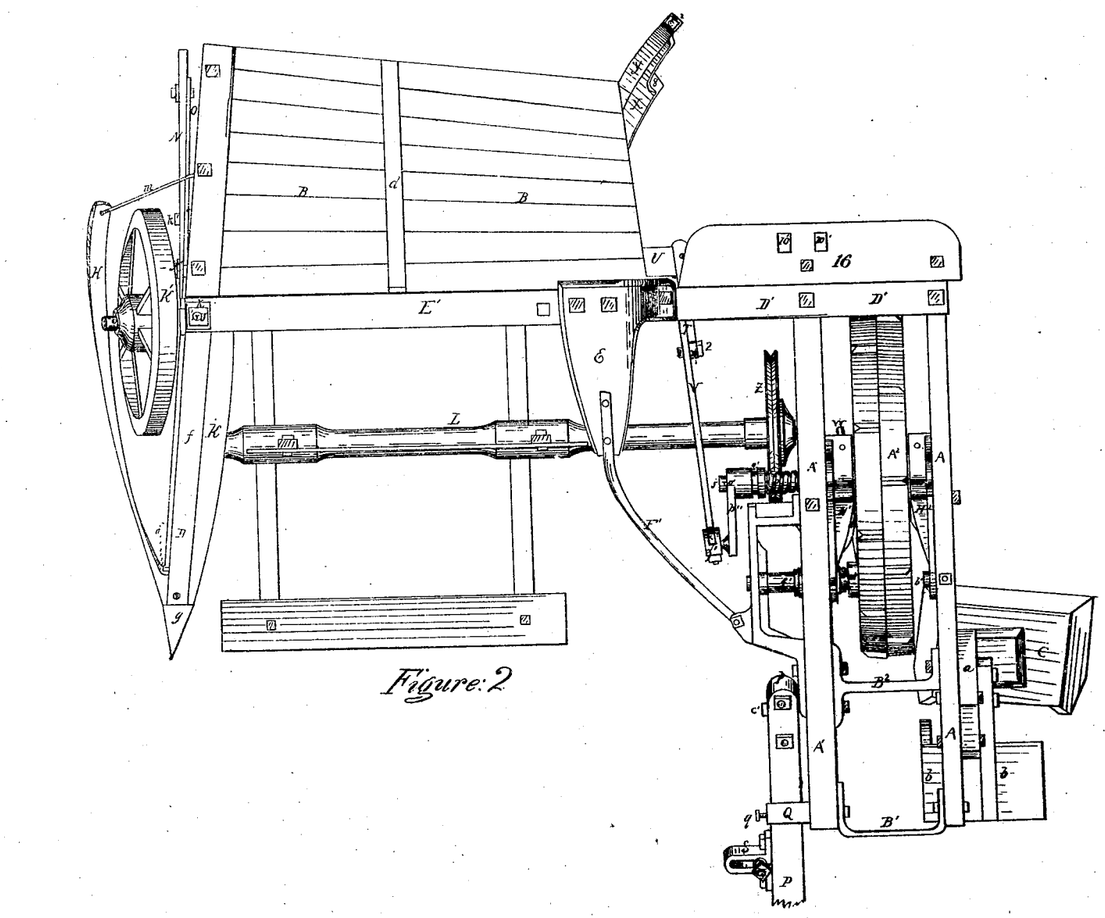
Fig. 2, a bottom view of the same.

B is the platform, made of thin boards in the working machine, of such wedge-shape as to form, when laid together, about the same circle the rake describes in passing over the platform, and confined to the proper number of battens $d$ under them, as seen in Fig. 2. This platform is shown extended so far only as is necessary for depositing the gavels in rear of it, and so far inward that the binder can approach them from either side, but when desired may be extended the proper distance, and in about the curve the rake describes in passing over it, for removing the gavels so far aside as to be out of the machine's road when cutting a succeeding round.

The inner end or side of this platform is so much further out at its rear than its front as to pass freely by the gavels when deposited on the ground, directly from the inner side, without being dragged by this part.

By having the platform thus made of thin boards connected to thin battens under them, that run in a backward direction, as shown, it can freely slide on the ground when the cutting apparatus is run close thereto, to cut lodged grain—a great desideratum.

When it is desired to remove the gavels so far around as to be out of the machine's road when cutting the next round, it is best to so shape the platform as to attach the rake's center of motion to beam $A^1$, or between $A^1$ and A, so that the rake-head may be shorter, and the platform in a smaller compass. The outer end of the platform is attached to the divider by screw-bolts, and the inner end to the finger-bar by a single screw-bolt, which passes through the front end of the plate $e$, which is firmly secured to the platform and the finger-bar. By having the platform thus constructed, it is very quickly attached for reaping, or detached for mowing. D, Fig. 9, is the divider. Its sill $f$ is made of a long piece of timber, some two and a half inches thick on the finger-bar. This sill is straight on the inner edge, and placed at such an angle to the finger-bar as to throw the point further out than the line in which the grain-wheel treads, while this wheel's hub is in the same vertical plane with the finger-bar. The outer edge of this sill is made narrower than the inner edge by removing a wedge-shaped portion from the lower side, that the vertical angle of this divider to the finger-bar may be about the same as that of its sill's horizontal angle thereto, the better to prevent the outer ends of the reel-fans and outer end of the automatic rake from striking the divider. On this sill $f$, and directly over the finger-bar, stands the center-post $G'$, and in rear thereof the reel-post $F''$. The divider's frame-plate $i$ has its upper edge sloped downward and inward, and has its front end attached to the sill $f$, near the front end thereof. It extends backward over the center-post (to which it is connected) to the reel-post $F''$, where it is confined by a joint-bolt at the proper height. It is covered by a cap, $i^1$, sloping as the plate $i$ does. The space between this cap and the sill $f$ is boarded up on the inner side, as seen at $h$, Fig. 6. The central portion of the center-post $G'$ is thicker than the ends, (the lower end being the thickness of the sill $f$, and the upper end is reduced nearly to the thickness of the plate $i$,) for the purpose of bringing the axle-plate I of the grain-wheel $K'$ oblique to the finger-bar, so that the tread of the grain-wheel may be further inward than it would be were the post $G'$ no wider above than at the sill $f$. The plane of the grain-wheel should be about at right angles to the finger-bar, (though it is better to set the front edge a little further out than the rear, so that the machine may be turned in at the corners readily,) and it is therefore necessary to remove a wedge-shaped piece from the outer side of the sill to form the seat of the axle-plate I, the thickest portion of said wedge being toward the front of the machine.

Figure 3:
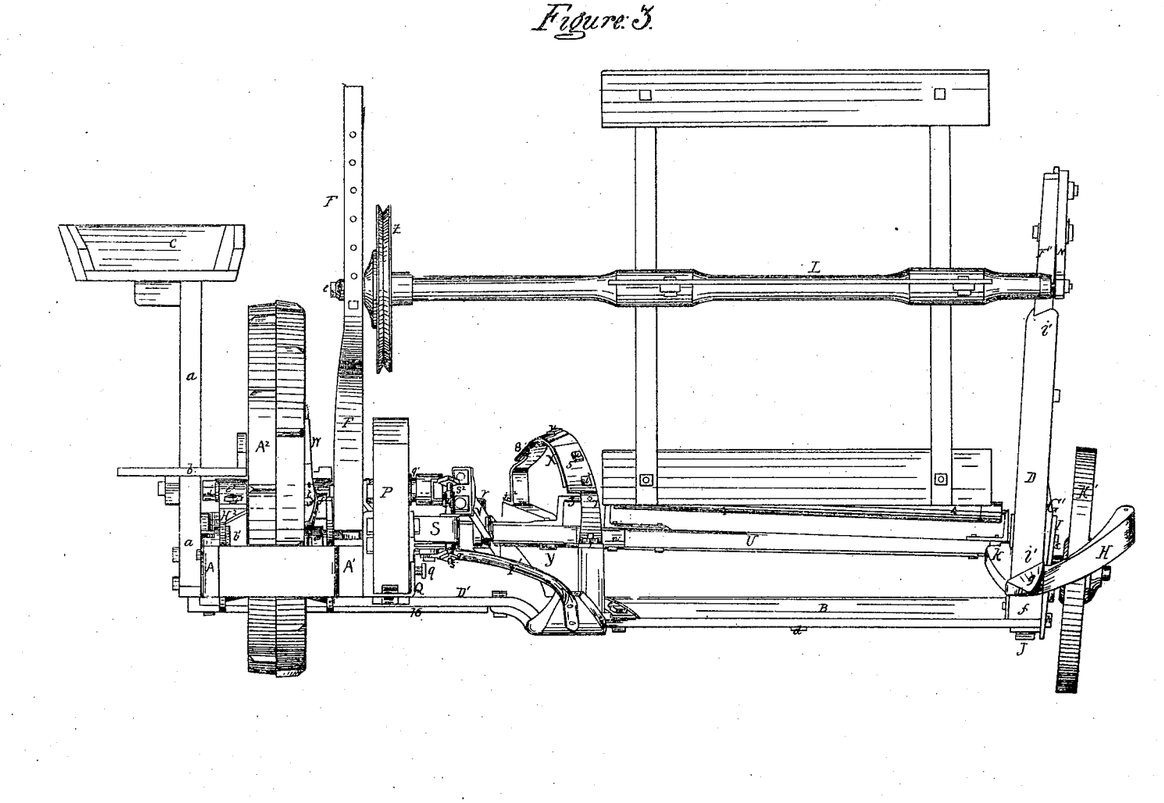
Fig. 3, a front elevation.
Figure 4:
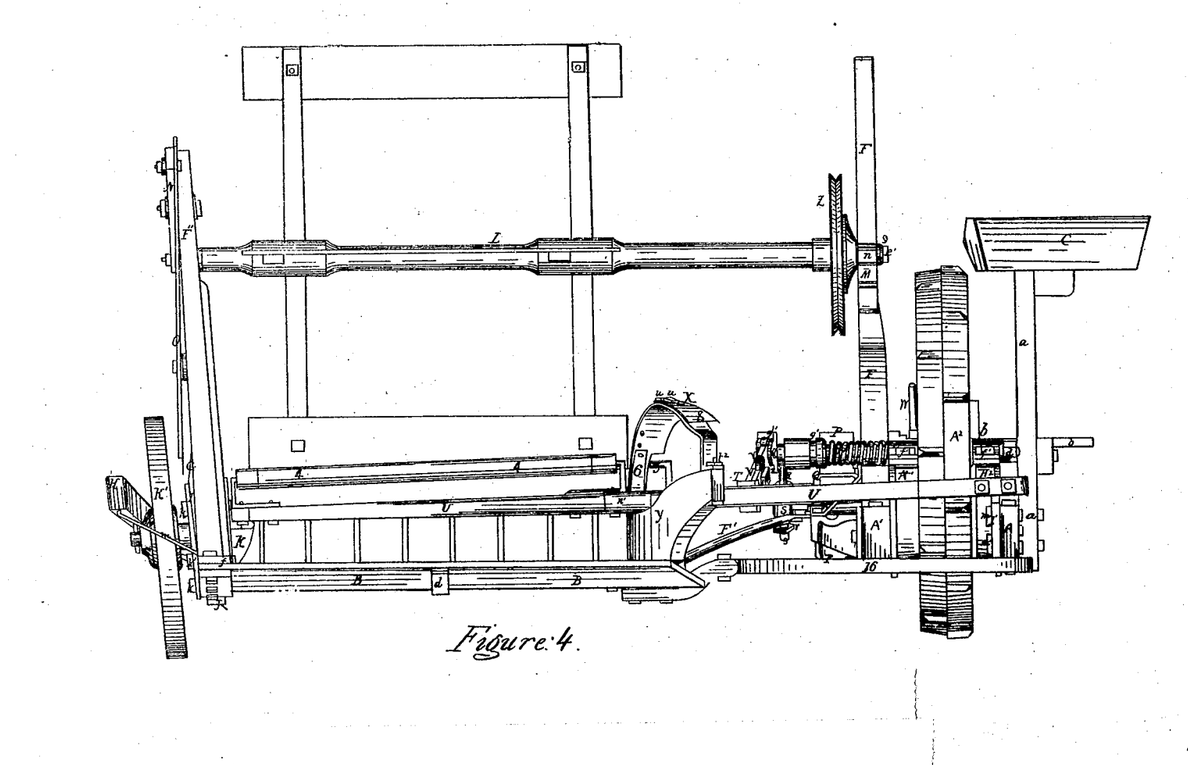
Fig. 4, a rear elevation.

To connect this divider to the finger-bar, a joint-bolt, J, Figs. 2, 3, and 4, passes upward through the finger-bar, sill, and into a nut let into the rear part of the post $G'$, to bind these parts firmly together.

The axle of the grain-wheel is set upon the axle-plate I, about at right angles to its surface, and said plate is secured to the post $G'$ by the bolts $k'$ $k'$, which pass through it above and below said axle. The bolt $k$ passes through the lower end of the axle-plate into the finger-bar, and it has upon its outer end a screw-nut, which may be tightened up as desired, to prevent the leverage of this wheel from throwing the upper portion of the divider out of its proper position. The upper end of this plate I is confined to the post $G'$ by one or more screw-bolts $k'$. By having the grain-wheel $K'$ thus connected to the outer end of the finger-bar and divider, the same piece of iron always has a portion of it below and firmly held to the finger-bar, to prevent the leverage of the grain-wheel from throwing the upper portion of the divider into the road of the reel and automatic rake when the machine is turned at the corners or otherwise. By having the grain-wheel's axle-plate I thus constructed, one end may be longer and have a greater number of holes in it than the other, and used whichever end down that is desired.

$g$ is the metal dividing-point, having its front end sharp for entering and separating the grain to be cut from that left standing, and its rear end hollow and properly shaped to inclose the front ends of the divider's sill and other front portions of the divider, and also so as to receive the point of the guiding-board K and the grain-wheel's fender-board H, and confine them properly. This dividing-point is secured to the divider by a single bolt or screw, so that it may be readily attached or detached.

The guiding-board K is to regulate the lean of the grain inward, as the reel and cutters come in contact with it. It is made wedge-shaped, straight next the divider, but somewhat rounding next the grain, which comes against it, with its front end inserted into an opening left at the side of the sill, in the dividing-point, and its rear end is attached to the divider by a single screw-bolt, and made vertically adjustable so as to give the grain more or less inclination inward, or to keep its inclination the same while the cutting apparatus is raised or lowered.

H is a removable fender-board outside of the grain-wheel. It is made of a thin board with a short wedge attached to its side next to the divider and near said board's point, to form a fulcrum over which the board is slightly bent to give it a circular bend around the grain-wheel. The rear end of said wedge also forms a catch-connection with a short stud, $a^5$, Fig. 2, set in the sill $f$, that prevents the point of this fender-board from slipping out of its seat in the metal point $g$ when the rear end is dropped on its sustaining-hook $m$, which sustaining-hook is attached to the top of the sill $f$, so as to hold the rear end of this fender-board in its proper place to press the standing grain away from the upper portions of the grain-wheel, &c. Thus arranged, this fender-board is very readily attached and detached, being held in place on hook $m$ by its own weight, and its broad side next the standing grain so as to slide by and lean it outward toward the center of the next swath without breaking the straw.

This fender-board H, as well as the guiding-board K, forms part of the divider, the length of which, in front of the cutting apparatus, together with its height at the reel-post $F''$ and the width through the guiding and fender boards at the cutting apparatus, insures a separation of the grain in a very perfect manner.

M, Figs. 4 and 5, is the reel-bearer, attached to its post F by a short stud and single bolt. This bearer has two bearings for the reel-shaft L, to give it a horizontal adjustment, and when desired may have more. In the post F is a series of holes, through either one of which the clamping-bolt may pass to give the bearer M the desired vertical adjustment. The rear bearing for the inner end of the reel-shaft L is generally used when mowing.

The inner end journal $n$ of the reel-shaft L, and the reel-pulley Z, are cast in one piece, which is, we think, the best way of making them, as they are then always true on the shaft, but they may be made separate and keyed together, or the journal $n$ only used. This journal $n$, instead of being inserted into the reel-shaft L, as is usually done, is made to encompass the shaft by being cast hollow and considerably larger at the outer end than where the inner end of the reel-shaft will be, so as to be drawn tight on it by a joint-bolt, $e^1$, that is inserted through the part that rests on the reel-bearer into a screw-nut in the reel-shaft.

By having the journal of harvester's reels thus connected to the reel-shaft, whether the reel-pulley be made a part of this journal or not, the journal is always in line with the center of the shaft, and kept tight thereon by tightening the joint-bolt. To make it sure that this hollow journal will not turn on the reel-shaft, it may be secured by a spline and feather, or some other convenient device. The outer end of this reel-shaft L is hung on the reel-bearer N, which is a straight piece of timber projecting forward and also backward from the reel-post F″. This reel-post F″, reel-bearer N, and its brace-rod O, all have horizontal holes through them, as seen at Figs. 5 and 6, to render the reel-bearer and reel capable of a vertical and horizontal adjustment.

U, Figs. 4 and 9, is the automatic rake, having its connection made with the rear end of beam A by a ball-and-socket joint, the ball being formed at the top of the slotted post I′, which is secured to the side of the beam A by the screw-bolts $m'\ m'$ and the socket in the box $s^2$, which is secured at the side of the rake-head by screw-bolts.

By this mode of attachment the joint or center of motion is permanent and the movements of the rake are always the same, so that there is no liability that the outer end of the rake will be thrown too far forward and strike the reel or the cutters, nor that it will fall short and fail to remove the gavel properly, as might be the case with any joint which permits more or less play.

By having a slot, as shown at Fig. 9, in the post I, the rake's center of motion can be adjusted vertically, so as to have the outer end at the proper height in respect to the platform, and by having a curved slot in the beam A, as seen at Fig. 5, at lower $m'$, the axis of the curvature of which is the upper bolt $m'$, the rake's center of motion can be given a longitudinal variation, so as to bring the rake further forward or backward, as desired.

The rake-head is made straight on the front edge and rounding on the rear, with a metal cup, $n'$, Fig. 3, between it and its carrying-arch Y, to prevent wear. The advantage gained by making the rear edge of the rake-head rounding is that it shall strike on the arch Y, while the outer end is a short distance above the platform, but come down to it before commencing to remove the gavels, by reason of the motion of the crank $p''$, the wrist coming down after the rake is dropped into the gavels and before commencing its removal from the platform. This object is further accomplished by attaching the rake's center of motion to its front edge, as by this means the rear edge is virtually made much more rounding.

The rake-pitman is made adjustable as to its length and the angle of its connection with the rake-head by means of the two parts confined together by screw-bolts $l\ l$. Through V, near its rear end, are made two horizontal slots, one for each of these bolts $l\ l$. Through T, near its center, is made a horizontal round hole for the rear bolt $l$, and near the front end a curved slot, the center of which curvature is the rear bolt $l$, to receive the front bolt $l$, and enable the attendant to have these parts, V and T, adjusted, and in the desired position to each other, by tightening the screws 2 2. The rear end of T is forked, one part above and one below the rake-head, which has an iron plate above and below, between it and these forks, to reduce wear, and is confined thereto by a screw-bolt.

This automatic rake is driven by the crank $p''$ on the axle $j'$. The coiled spring $o$ is placed on said axle, back of said crank, to hold it in connection with its clutch-pin $o'$, when not held out of connection therewith by the shipper (not shown) in the groove $q'$. By having this crank $p''$ thus connected with the axle $j'$, it is readily attached or detached. The wrist-joint between the crank $p''$ and pitman is a ball and socket, the ball being upon the crank, and the socket formed in the box $x'$, secured to the end of the pitman, and all the advantages of free movement in any direction, upon a central point, are thus secured.

Y is a guideway, of about the same curvature as the rake describes in passing over it, to hold the grain in place on the platform, and guide the automatic rake U over the platform while removing the gavels. From the front end backward nearly to the rear end, the upper edge of the guideway is about parallel with the surface of the platform, but its rear end slopes upward, so that the rake is raised up and its teeth withdrawn from the gavel about the time the gavel leaves the platform. The arch X has its feet secured to the front and rear ends of the guideway Y, and its outer end is notched, so that as the rake moves up the rear slope of the guideway, the rake-carrier 3 passes through the rear notch and raises the spring-latch 8, which drops behind said arm after its passage. When the rake commences to move forward again, the carrier 3 engages with the upper surface of the spring-latch 8, and is thereby caused to travel up over the arch to the front end thereof, where the carrier 3 drops through the front notch and the rake falls upon the platform again, preparatory to another backward stroke. The front end of this guideway Y is firmly attached to the extension-bar D', over the inner end of the finger-bar, by a screw-bolt, r', Fig. 1, which is passed up through the shoe, the finger-bar, extension-bar, this guideway, and the front end of the arch X permitting this end of X to have a vertical adjustment, so as to carry the rake higher when desired. The front ends of the guideway Y and arch X are firmly held in place by a screw-nut run onto the end of this bolt r', and the platform B is confined to the rear portion of the guideway Y, when desired, by a screw-bolt, which holds both the platform and guideway more securely in place.

This rake-carrier 3, as shown, is formed by bending up the outer end of the upper plate, between the rake-head and the upper fork of its driving-pitman, at right angles to the head, and then making another right-angle bend outward, in this bent-up portion, at the proper place to hold the rake-head close under the arch X, while the outer end portion, after being reduced to a round stud at the front, rests upon the arch X to carry the rake under it. In order that this rake-carrier 3 may ascend and travel forward on the arch X, after the rake has removed the gavels, and the upward incline of the guideway Y has raised the rake-teeth out of the gavel, a self-adjusting device must be combined with the rear portion of this arch X and carrier 3.

Figure 1:
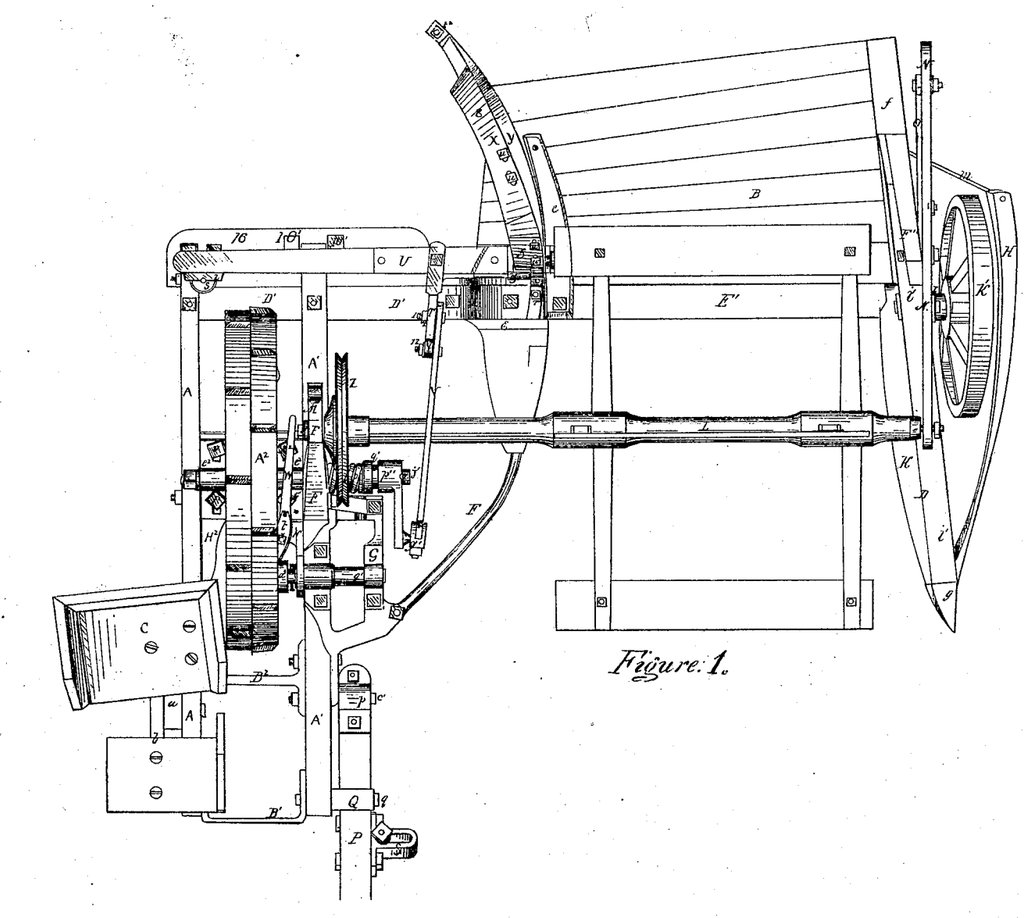
Figure 1 of the drawings represents a top view of a combined mowing and reaping machine, constructed on our present improved plan.

To make it certain that this carrier 3 will ascend and travel forward on the arch X, we connect the adjustable spring 8 to the upper rear portion of this arch by set-screws $u\,u$, Fig. 1. And for enabling the attendant to have the rear end of this spring 8 held further backward or forward, slots are made in it, through which the set-screws $u\,u$ are passed into the arch X. A second advantage of this spring is that of serving as an indicator to the ear of the attendant, by having its rear end drop on the arch X, after being raised by the passage of the carrier 3 from under it, the proper time for disconnecting the crank $p''$ from its clutch-pin o', when an insufficient quantity of grain is cut at one revolution of the rake's driving-wheel for a gavel.

5 is an adjustable gage-plate, with slots in it, through which the set-screws $w'\,w'$, Fig. 1, pass, to confine it to the upper front portion of the arch X, to enable the attendant to regulate the height of the rake's drop, without varying the height of the front end of this arch X, as is done when the rake is to be carried high over the cut grain. 6 is a spring, as seen in Fig. 4, for checking the drop of the rake and preventing its breaking by being suddenly dropped when the machine is driven fast over rough surfaces. In this case the spring 6 is made of a flat bar of steel, with its upper end attached to the rear or inner side of the arch X, near its front end. And that the attendant may be enabled to make this spring bear more or less heavily against the rake, a set-screw, 7, is inserted through the arch X, below the spring's rigid connection therewith. Should this spring 6, or its equivalent, be used with an automatic rake, which has the outer end moved vertically, as well as horizontally, upon a center of motion at the inner end, as ours is, but in other respects differing from ours, it will be obvious that it must be made to suit such change.

4, Fig. 4, is the rake-protector, for preventing entanglement of the rake with the cut grain while removing the gavel from the platform, and, as shown, it is a roller suspended on center-pins, projecting toward and into its ends, from the upper ends of bent-up bars attached to the rake-head. This rake-protector, as the rake removes the gavels from the platform, revolves from under any grain that may have fallen on it, and thus causes a very perfect separation to be made between the gavels. To secure lightness, it may be made hollow, and, when desired, made fast to the head.

16 is the raker's adjustable and removable foot-board, with a hole near its center, through which, and through a vertical hole in the rear end of beam $A^1$, passes a screw-bolt that confines it to the under or upper edge of this beam as desired. The inner end of this foot-board 16 is confined to beam A by another screw-bolt passed through them, in the same manner as that through $A^1$, at either side of which, through this board, is a square hole, 10', for the leg of either of the raker's seats or stands 7" or 8', Fig. 8, to pass through when on the upper edges of the beams A and $A^1$, or $A^1$ only.

7' is the adjustable and removable raker's stand or seat, to sustain the raker face forward. 12 is the leg of this seat, having the upper end attached to the under side of beam 10, on the rear end of which is secured the seat 7'. There are two horizontal holes made through both the front portion of beam 10 and reel-post F, that this seat 7' may have a lateral adjustment. This seat is secured to the beam $A^1$ by a single screw-bolt, and by another to the reel-post. The raker, when on this seat can, by the aid of a properly-constructed rake, remove the gavels from the platform in the same manner as the automatic rake does, and also, by a common rake, draw the gavels from the platform directly toward himself sidewise, leaving them on the ground, heads backward, out of the machine's road, when cutting the next round.

8′ is the adjustable and removable raker's stand or seat, on which the raker rides face backward. 13 is the leg of this seat, to the upper end and front side of which is secured the raker's front support 15, and to the front side, below this support, is attached the rear end of beam 14, having secured to it the seat 8′, and two horizontal holes in its front portion, to permit the seat to have a lateral adjustment. The lower end of this leg 13 is confined to beam A¹ by the same bolt that confined the leg 12 of seat 7′ thereto, and the beam 14 to the reel-post F, by the same bolt that confined the beam 10 to this post. From this seat the raker, by the aid of a common rake, can remove the gavels from the platform sidewise, directly toward himself, leaving them heads backward, or take hold of them at or near the heads, with the rake, and draw them from the platform, with a quick motion, and lay them at right angles to the machine's forward movement, heads from it. These adjustable seats 7′ and 8′, as will be observed, are each to occupy the other's place when desired, and either used on a single reaper, a combined reaper and mower, or on a combined mower and self-raking reaper, for converting the same into a hand-raking machine, when desired, that the attendant may have the gavels removed from the platform in any of the herein-described modes of removing them, by a mere change of minor parts. When the attendant desires to change the machine from a self-raker, as it is now shown, into a hand-raker, he will remove the crank p″ from the axle j′, the boxes s² from the ball or post I′, and the guideway Y and arch X, (except when he desires to have the gavels removed in the same manner the automatic rake removes them, when the guideway Y need not be removed,) and attach the proper one of the stands or seats 7′ and 8′. To change the machine back again into a self-raker, the attendant will make a vice versa change, and then, for converting the machine into a mower, he will remove all from the main frame, except the cutting apparatus and driver's seat, and change this seat to that place on the frame which will, when he is in it, properly balance the cutting apparatus upon the cutter's driving-wheel, and then attach a dividing-point and track-clearer, (not shown, as their use is well known,) and make the proper vice versa change of parts when the machine is to be changed back to a self-raking reaper or a hand-raking reaper.

It will be observed that the main frame and driver's seat are so constructed and connected together that the driver can, by merely shifting his seat, place his weight at either side of the path of the cutter's driving-wheel and in front or rear of its axle, whether the machine is being used for mowing or reaping, and thereby properly balance the machine on this wheel when doing its different kinds of work, and in whatever one of the herein-described modes of doing it.

And it will be further observed that, as the machine is drawn forward, the automatic rake, when not interfered with by the attendant, removes a gavel at every revolution of the cutter's driving-wheel, and that he can have said removals made less frequently by disconnecting the crank p″ from its clutch-pin, when the spring 8 indicates to his ear that the rake has passed further back than its end, and that it is in position to cause the carrier 3 to pass above it and over the cut grain on the platform, by a shipper, whose rear end is inserted in the groove, but not herein shown, having been shown in the machine of William N. Whiteley, jr., the former one of us, patented November 25, 1856, and upon which machine ours is an improvement.

From the foregoing, it is believed any one familiar with the construction and operation of harvesters will be enabled to use our invention without further invention, and therefore no further explanations are given.

It will be obvious that various modifications may be made in the construction of the parts claimed as new, and also in the construction of the parts the combination only of which is claimed, without departing from the principles by us first applied in the harvester, and for this reason we do not wish to be understood as limiting our claims to the particular detail of construction used in the several parts claimed as new, or to the particular detail of constructing the parts, the combination of which we claim; but What we do claim, and desire to secure by Letters Patent, is—

1. The combination of the spring $t$, or its equivalent, with a harvester's clutch-lever, for the purposes specified.

2. The combination of the adjustable piece $p$ with the rear end of the harvester's tongue, substantially as set forth.

3. Attaching the draft-bolt R, Fig. 3, by which the team draws the machine, to the outer side of the tongue, that next the uncut crop, to obtain the advantages stated.

4. The combination of an adjustable draft-point by which the team draws the machine, and an adjustable driver's seat, and a detachable grain-platform in a harvester.

5. The construction and connection of the main frame and driver's seat of a harvester, in such a manner that this seat can be shifted from one to another of the herein-described places upon the frame, for the purpose stated.

6. The platform B, or an equivalent thereof, constructed and connected to the finger-bar and divider, in the manner and for the purpose set forth.

7. The following arrangement of parts in a harvesting-machine: The finger-bar substantially at right angles to its line of forward movement; the grain-wheel located so that some portion of its hub shall be in the same vertical plane with the finger-bar; the finger-bar further backward than the axle of the cutter's driving-wheel; the grain-wheel placed so that its tread shall be as far inward as the point of the divider; a supporting metal plate which always has a portion lower than the finger-bar, and firmly secured thereto, while the divider and part of this plate are firmly connected by screw-bolts.

8. The adjustable guiding-board K, constructed and connected to the divider as shown and described, and for the purposes specified.

9. Constructing and connecting the journal of a harvester's reel-shaft to said shaft, substantially as described, for the purposes specified, whether the reel-pulley be made a part of this journal or not.

10. In a harvester's rake, the outer tooth of which moves over the platform faster than the inner tooth, and the points of the teeth faster than their other ends, connecting the inner end of the rake-head to the main frame, by means of a ball-and-socket joint, or its equivalent, the moving parts of which can always be kept in snug working order, as set forth.

11. Making the post I', provided with a ball at its upper end, or an equivalent thereof, laterally adjustable, as and for the purposes described.

12. Making the post I', provided with a ball at its upper end, or an equivalent thereof, vertically adjustable, as and for the purpose set forth.

13. Placing the center of motion of a harvester's automatic rake at the front edge of the head of said rake, as and for the purposes specified.

14. Making the pitman, by which a harvester's automatic rake is moved when discharging the gavels from the platform, in two or more parts, and substantially as described.

15. In combination with a harvester's automatic rake, which has the outer tooth moved over the platform faster than the inner tooth, and removes the gavels heads foremost, a guiding-arch, X, which is above the rake-head and further inward than the inner tooth, and by which said rake is raised up above the platform during its forward stroke.

16. The arch X, constructed and combined with arch y, substantially as shown and described, for the purposes specified.

17. The combination of a guiding-arch, X, and the rake-carrier 3, or an equivalent thereof, with a harvester's automatic rake, which has the outer tooth moved over the platform faster than the inner tooth, and removes the gavels heads foremost.

18. Combining with a harvester's automatic rake, which has its outer tooth moved over the platform faster than the inner tooth, and removes the gavels head foremost, an arch to carry the rake forward over the next gavel, when said device is provided with a latch, which drops behind a part of the rake-head as it passes backward, and compels said rake to come forward over the next gavel.

19. The combination of the spring 8, carrier 3, and arch X, or an equivalent arrangement of parts, with a harvester's automatic rake that has the outer tooth moved over the platform faster than the inner tooth, and removes the gavels heads foremost, for the purposes specified.

20. Making the latch-spring 8 adjustable, for the purposes specified.

21. The combination of the adjustable gage-plate 5 with the front portion of the arch X, for the purposes specified.

22. The combination of the spring 6, or an equivalent thereof, with a harvester's automatic rake, the outer end of which moves upon a center at the inner end, and is carried forward over the cut grain by means of the arch X, or an equivalent thereof.

23. The rake-protector 4, constructed as described, and connected with the head of a harvester's automatic rake, for the purposes specified.

24. The raker's adjustable and removable foot-board, constructed and connected to the main frame, substantially as shown and described, for the purposes specified.

25. The adjustable raker's seat or stand 8', constructed and connected to the machine, as shown and described, for the purposes specified.

In testimony whereof we have hereunto set our hands.

WILLIAM N. WHITELEY, Jr.
ANDREW WHITELEY.

Witnesses as to William N. Whiteley, jr.:
REUBEN MILLER,
A. D. HOOK.
Witnesses as to Andrew Whiteley:
J. N. McINTIRE,
W. P. MENAY.